US012284747B2

(12) United States Patent
Kou

(10) Patent No.: US 12,284,747 B2
(45) Date of Patent: Apr. 22, 2025

(54) HOLLOW CATHODE DISCHARGE ASSISTANT TRANSFORMER COUPLED PLASMA SOURCE AND OPERATION METHOD OF THE SAME

(71) Applicant: Finesse Technology Co., Ltd., Hsinchu County (TW)

(72) Inventor: Chwung-Shan Kou, Hsinchu County (TW)

(73) Assignee: Finesse Technology Co., Ltd., Hsinchu (TW)

( * ) Notice: Subject to any disclaimer, the term of this patent is extended or adjusted under 35 U.S.C. 154(b) by 83 days.

(21) Appl. No.: 18/220,837

(22) Filed: Jul. 12, 2023

(65) Prior Publication Data

US 2024/0306284 A1 Sep. 12, 2024

Related U.S. Application Data

(60) Provisional application No. 63/450,652, filed on Mar. 7, 2023.

(30) Foreign Application Priority Data

May 10, 2023 (TW) ................................ 112117349

(51) Int. Cl.
*H05H 1/46* (2006.01)
*H01F 27/24* (2006.01)
(Continued)

(52) U.S. Cl.
CPC ........... *H05H 1/4652* (2021.05); *H01F 27/24* (2013.01); *H01F 27/28* (2013.01); *H05H 1/01* (2021.05)

(58) Field of Classification Search
None
See application file for complete search history.

(56) References Cited

U.S. PATENT DOCUMENTS 3,500,118 A 3/1970 Anderson
3,987,334 A 10/1976 Anderson
(Continued)

FOREIGN PATENT DOCUMENTS

CN 102598201 A 7/2012
JP 2004506339 A 2/2004
(Continued)

OTHER PUBLICATIONS

Kolobov et al., "Analytic model of the hollow cathode effect", Plasma Sources Sci. Technol. 4, 551, 1995.

*Primary Examiner* — Srinivas Sathiraju

(57) ABSTRACT

Disclosed are a hollow cathode discharge assistant transformer coupled plasma source and an operation method of the same. A reaction chamber with an annular channel is provided, and a ferrite transformer with a first ferrite magnetic core wound with a first coil and a second ferrite magnetic core wound with a second coil and a drive power source is provided. The drive power source applies an AC power supply with a first voltage to the first coil to generate an alternating magnetic field. The second coil generates a second voltage by inducing the alternating magnetic field to excite a working gas in the annular channel into a plasma through a hollow cathode discharge mechanism. The annular channel induces the alternating magnetic field through a transformer coupled plasma mechanism to generate an induced electric field to excite the plasma to form an electric current in the annular channel.

22 Claims, 7 Drawing Sheets

(51) Int. Cl.
*H01F 27/28* (2006.01)
*H05H 1/00* (2006.01)

(56) References Cited

U.S. PATENT DOCUMENTS

| | | | | | |
|---|---|---|---|---|---|
| 4,180,763 | A | 12/1979 | Anderson | | |
| 4,431,898 | A | 2/1984 | Reinberg et al. | | |
| 5,965,034 | A * | 10/1999 | Vinogradov | H01J 37/321 | 315/111.21 |
| 6,432,260 | B1 | 8/2002 | Mahoney et al. | | |
| 6,858,112 | B2 * | 2/2005 | Flamm | H01J 37/32174 | 216/68 |
| 7,005,845 | B1 * | 2/2006 | Gonzalez | H01J 37/321 | 324/117 R |
| 8,409,400 | B2 * | 4/2013 | Wi | H01J 37/321 | 156/345.48 |
| 9,736,920 | B2 * | 8/2017 | Smith | H01J 37/32192 | |
| 10,076,020 | B2 * | 9/2018 | Smith | H01J 37/32192 | |
| 10,715,095 | B2 * | 7/2020 | Long | H03H 7/0153 | |
| 10,923,322 | B2 * | 2/2021 | Lopez | H01F 27/292 | |
| 2003/0071035 | A1 * | 4/2003 | Brailove | H05H 1/46 | 219/635 |
| 2003/0085205 | A1 * | 5/2003 | Lai | H01J 37/32431 | 219/121.52 |
| 2003/0123992 | A1 * | 7/2003 | Mitrovic | H01J 37/32834 | 417/48 |
| 2004/0150386 | A1 * | 8/2004 | Gonzalez | H01J 37/32174 | 324/117 R |
| 2004/0163594 | A1 * | 8/2004 | Windhorn | H01J 37/32082 | 118/723 E |
| 2004/0185610 | A1 * | 9/2004 | Lai | H01J 37/32431 | 438/200 |
| 2005/0000655 | A1 * | 1/2005 | Wi | H01J 37/321 | 156/345.48 |
| 2007/0145018 | A1 | 6/2007 | Smith et al. | | |
| 2010/0290972 | A1 * | 11/2010 | Cicero | C01B 33/03 | 423/349 |
| 2015/0000844 | A1 * | 1/2015 | Woo | H05H 1/46 | 315/111.41 |
| 2017/0303382 | A1 * | 10/2017 | Smith | H01J 37/32247 | |
| 2018/0366301 | A1 * | 12/2018 | Lopez | H03H 7/38 | |
| 2019/0109576 | A1 * | 4/2019 | Long | H03H 7/0153 | |
| 2022/0262596 | A1 * | 8/2022 | Chen | H05H 1/4645 | |
| 2023/0009651 | A1 * | 1/2023 | Kapoor | H01J 37/321 | |
| 2024/0306284 | A1 * | 9/2024 | Kou | H01F 27/28 | |

FOREIGN PATENT DOCUMENTS

| | | | |
|---|---|---|---|
| JP | 2010003699 | A | 1/2010 |
| JP | 2015512117 | A | 4/2015 |
| KR | 20200048984 | A | 5/2020 |
| TW | M628523 | U | 6/2022 |
| TW | M650971 | U | 2/2024 |

* cited by examiner

HOLLOW CATHODE DISCHARGE ASSISTANT TRANSFORMER COUPLED PLASMA SOURCE AND OPERATION METHOD OF THE SAME

CROSS-REFERENCE TO RELATED APPLICATION

This application claims priority to U.S. Provisional Patent Application No. 63/450,652, filed on Mar. 7, 2023; and claims priority from Taiwan Patent Application No. 112117349, filed on May 10, 2023, each of which is hereby incorporated herein by reference in its entireties.

BACKGROUND OF THE DISCLOSURE

1. Field of Disclosure

The disclosure relates to a plasma source and its operation method, and more particularly to a hollow cathode discharge assistant transformer coupled plasma source and an operation method of the same.

2. Related Art

Plasma has been widely used in semiconductor manufacturing and other industrial manufacturing. Its advantage is that it could decompose gas molecules to produce a highly reactive mixture composed of neutral free radicals, ions, atoms, electrons, and excited molecules to provide various physical and chemical reactions required by the manufacturing process. There are many different mechanisms to generate plasma, one of which is to use a ferrite transformer magnetic core to generate inductively coupled plasma discharge. The main mechanism is as shown in FIG. 1A and FIG. 1B, using a ferrite transformer magnetic core 502 to generate an induced electric field in an annular vacuum chamber 500 to cause a gas to discharge. One end of the annular vacuum chamber 500 is a gas inlet 506, and another end thereof is an outlet 508. This method is similar to the principle of a transformer. The power supply is connected to a primary-side coil of the ferrite transformer magnetic core 502 to generate a magnetic field, and a magnetic flux in the magnetic core induces an electric field in the annular vacuum chamber 500 to drive an electron drift current to flow in a closed path along the annular vacuum chamber 500, and the annular plasma structure formed becomes a secondary side of a single coil of the transformer to achieve extremely high coupling efficiency. Therefore, this mechanism is also called transformer coupled plasma (TCP). However, the structure of the annular vacuum chamber 500 must provide an electrical barrier area with a ceramic ring plate 504, otherwise it will cause a short circuit to the ferrite transformer magnetic core 502 and could not generate an induced electric field in the annular vacuum chamber 500. An electrical barrier area must be small enough to generate an electric field strength strong enough to excite and maintain a stable plasma. However, under the influence of the metal structure of the annular vacuum chamber 500, the strong electric field generated by the ferrite transformer magnetic core 502 will concentrate in the electrical barrier area formed by the ceramic ring plate 504, sometimes causing regional discharge and causing the ceramic ring plate 504 to crack and destroy the electrical barrier, and even the drive power supply will be damaged by reverse discharge, or causing a protective coating of the reaction chamber to fall off.

Anderson describes this method in U.S. Pat. Nos. 3,500,118 and 3,987,334. U.S. Pat. No. 4,180,763 discloses to apply ferrite magnetic core TCP to lighting applications. Reinberg et al. disclose in U.S. Pat. No. 4,431,898 the application of removal of photoresist by plasma in semiconductor manufacturing process.

This TCP technology has been applied to dissociation of gas to provide a plasma source of a large number of activated particles. In some high gas pressure and high gas flow applications, it is required to use high-power density plasma to chemically activate the working gas or change the properties or components of the gas, and then these chemically activated gases are sent to the vacuum processing system. Such applications are known as “remote plasma processing” and include: (1) remote chamber cleaning; (2) remote chamber ashing of polymer surfaces; (3) downstream fore cleaning in vacuum forelines and aftertreatment gas abatement. Many of these applications involve high flow rates (greater than 1 slm (standard liters per minute)) of electronegative plasma discharge gases (e.g., $O_2$, $NF_3$, $SF_6$) and relatively high gas pressures (greater than 1 Torr). Therefore, a high-power density is generally required to achieve high dissociation and activation of the working gas.

Under the operating conditions of high gas pressure and high gas flow rate, like many inductively coupled plasma source equipment, the strength of the induced electromagnetic field of TCP is not sufficient to ignite the plasma discharge, other means must be used to introduce a high-intensity electric field in the vacuum reaction chamber to induce plasma discharge, such as adding a high voltage device, or introducing a high AC voltage to an electrically isolated part of the chamber to generate a local radio-frequency glow discharge through a vacuum window (e.g., quartz or ceramic). However, the service life of the high-voltage discharge device and the vacuum window limits the availability. However, even so, the high-voltage discharge device is still not sufficient to provide stable excitation conditions for TCP under high gas pressure and high gas flow rate. Therefore, some documents propose to add a resonant circuit to the TCP drive power circuit to generate high voltage (1-10 kV) to cooperate with a high-voltage discharge device to effectively generate regional discharge in order to further generate the annular plasma structure required by TCP. However, if the same resonance voltage is still used after the annular plasma is generated, an extremely high current will be generated to cause damage to the power components. Therefore, a high-voltage relay must be installed on the circuit, so that the power circuit quickly turns into a non-resonant circuit after the plasma is generated to reduce the voltage to avoid damage from high current. However, if the relay is faulty or the control signal is delayed and the relay could not be activated immediately, the power components could not be protected and the power components will be damaged. On the other hand, the use of high voltage could easily cause damage to the insulation components of the vacuum chamber, resulting in electrical short circuit, and also cause the coating on the chamber wall to fall off and flow into the process chamber, resulting in particle pollution.

On the other hand, as shown in the known art in a cylindrical discharge structure (as shown in FIG. 2), a relative voltage applied on a cylinder 600 and another metal 602 could produce a hollow cathode effect under proper operating conditions, which enables more efficient use of fast electrons and ions, and could generate a high-density plasma at a relatively low voltage, that is, hollow cathode discharge. In this hollow cathode discharge effect, fast electrons are confined by static electricity and could oscillate between opposing cathode surfaces (i.e., forming so-called pendular electrons), thus most of the electron energy gained in the cathode-fall region will be dissipated in the plasma. In addition, the proportion of plasmonic ions incident on the cathode surface to generate secondary electron emission is increased. According to research results, the discharge characteristics of the cylindrical structure show that when the voltage is small and the current is small, a low-density diffuse glow discharge appears; when the voltage increases, the current increases, the discharge appears an abnormal glow discharge (AGD); if the voltage increases again, the hollow cathode discharge effect will be caused, as the increasing speed of the current becomes larger, the plasma density will also increase significantly, and a large area of plasma will be formed in the cylindrical structure. The voltage generated by the hollow cathode discharge is determined by the size of the cylindrical structure and the operating gas pressure, and is typically several hundred volts (300 V-500 V).

SUMMARY OF THE DISCLOSURE

In view of the above-mentioned problems in the prior art, the disclosure combines a hollow cathode discharge mechanism and a transformer coupled plasma mechanism to form a composite plasma source for gas dissociation and chemical activation. A structural design of the disclosure is capable of effectively improving a stability of a high-density inductive plasma mode generated by a transformer coupled plasma source.

In order to improve the above-mentioned drawbacks of the existing TCP plasma technology. A main technology of the disclosure lies in integrating several hollow cathode discharge structures and TCP transformer coupled plasma reaction chambers to form a composite plasma source. The disclosure uses the hollow cathode discharge mechanism to effectively generate a plasma in different regions in a reaction chamber, so that the TCP mechanism is capable of easily forming an annular plasma structure, and effectively coupling high-power to generate a high-density plasma. In this way, on the one hand, the drawbacks of having to use a high-voltage ignition device and resonance operation could be eliminated, at the same time, because the hollow cathode discharge mechanism is responsible for exciting and maintaining an initial plasma, the drawbacks of TCP's weak electric field could be solved and a stability of the plasma could be improved.

The disclosure provides a hollow cathode discharge assistant transformer coupled plasma source, comprising: a reaction chamber having an annular channel; and at least one ferrite transformer comprising a first ferrite magnetic core wound with a first coil, a second ferrite magnetic core wound with a second coil, and a drive power source, wherein the annular channel of the reaction chamber passes through a hollow area between the first ferrite magnetic core and the second ferrite magnetic core, wherein the drive power source applies an AC power supply with a first voltage to the first coil to generate an alternating magnetic field on the first ferrite magnetic core, wherein the second coil generates a second voltage by inducing the alternating magnetic field, and the second voltage is applied to at least one hollow cylindrical tube of the reaction chamber to excite a working gas in the annular channel into a plasma through a hollow cathode discharge mechanism, wherein the annular channel of the reaction chamber induces the alternating magnetic field through a transformer coupled plasma mechanism to generate an induced electric field to excite the plasma to form an electric current with a closed path in the annular channel of the reaction chamber to further dissociate the working gas in order to increase a density of the plasma.

The disclosure further provides an operation method of a hollow cathode discharge assistant transformer coupled plasma source, characterized in that utilizing a hollow cathode discharge mechanism to cause a working gas forming a plasma in the hollow cathode discharge assistant transformer coupled plasma source, and utilizing a transformer coupled plasma mechanism for coupling energy to the plasma to cause the plasma discharging and generating an electron drift current, and further effectively dissociating the working gas to increase a density of the plasma.

In order to enable the examiner to have a further understanding and recognition of the technical features of the disclosure, preferred embodiments in conjunction with detailed explanation are provided as follows.

BRIEF DESCRIPTION OF THE DRAWINGS

FIG. 1 is a schematic diagram of an annular vacuum chamber of an annular low electric field plasma source of the prior art, wherein

DETAILED DESCRIPTION OF THE DISCLOSURE

Figure 1A:
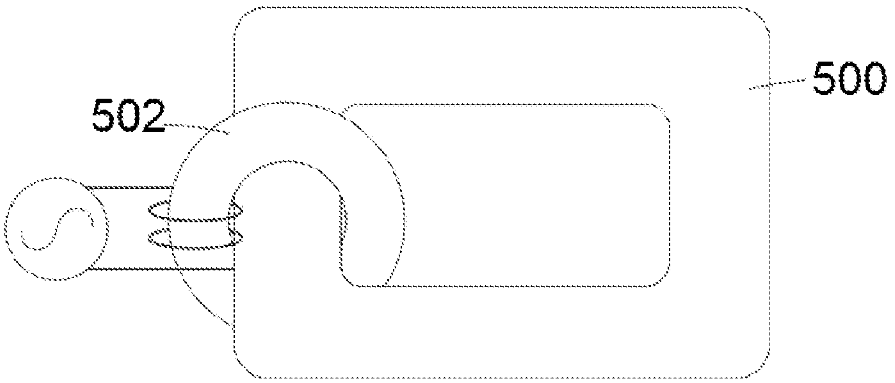
PRIOR ART FIG. 1A
FIG. 1A is a perspective view.
Figure 1B:
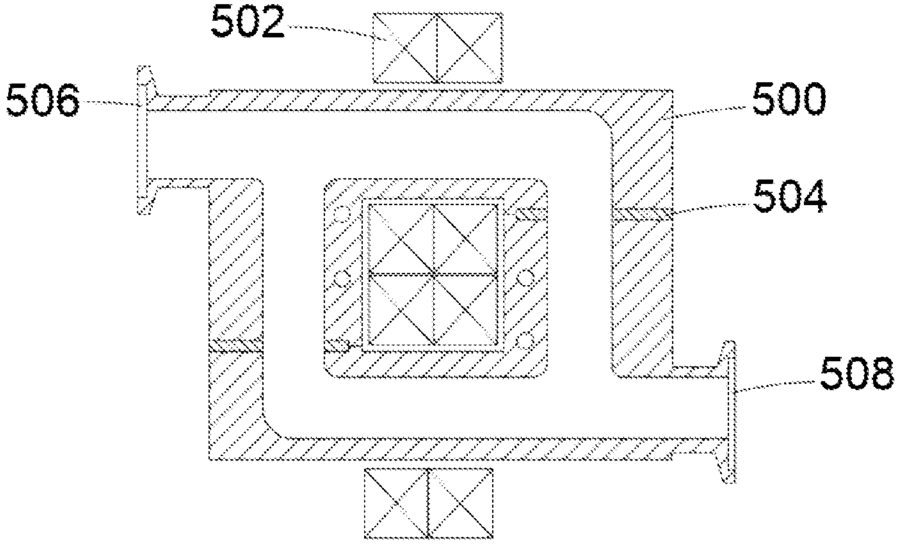
PRIOR ART FIG. 1B
FIG. 1B is a cross-sectional view.
Figure 2:
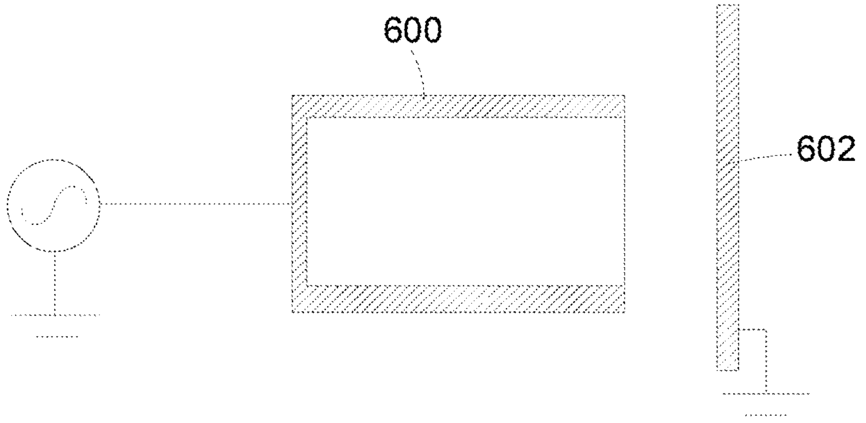
PRIOR ART FIG. 2
FIG. 2 is a cross-sectional view of a cylindrical discharge structure of the prior art.

In order to understand the technical features, content and advantages of the disclosure and its achievable efficacies, the disclosure is described below in detail in conjunction with the figures, and in the form of embodiments, the figures used herein are only for a purpose of schematically supplementing the specification, and may not be true proportions and precise configurations after implementation of the disclosure; and therefore, relationship between the proportions and configurations of the attached figures should not be interpreted to limit the scope of the claims of the disclosure in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present disclosure will be defined below or in other parts of the descriptions as an extra guidance for those skilled in the art to understand the descriptions of the present disclosure.

The terms such as “first”, “second”, “third”, “fourth” used in the descriptions are not indicating an order or sequence, and are not intending to limit the scope of the present disclosure. They are used only for differentiation of components or operations described by the same terms.

Moreover, the terms “comprising”, “including”, “having”, and “with” used in the descriptions are all open terms and have the meaning of “comprising but not limited to”.

Figure 3:
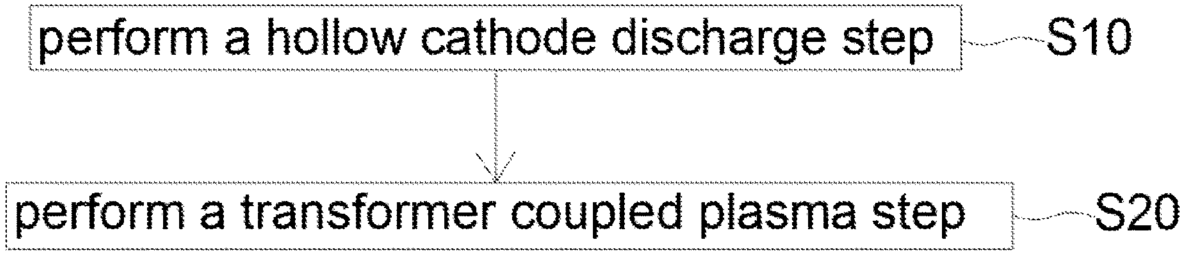
FIG. 3 is an operation flowchart of a hollow cathode discharge assistant transformer coupled plasma source of the disclosure.

The disclosure provides a composite plasma source and an operation method of the same, which combines a hollow cathode discharge mechanism and a transformer coupled plasma (TCP) mechanism. FIG. 3 is an operation flowchart of a hollow cathode discharge assistant transformer coupled plasma source of the disclosure. As shown in FIG. 3, the operation method of the disclosure is to perform a hollow cathode discharge step (step S10) to make a working gas form a plasma, and to perform a transformer coupled plasma step (step S20) to effectively couple energy so that the plasma discharges to generate an electron drift current, and further effectively dissociate the working gas to generate a high-power and high-density plasma. The disclosure utilizes the hollow cathode discharge mechanism to effectively cause the working gas generate a plasma in different regions in a reaction chamber, so that the TCP mechanism is capable of easily forming an annular plasma structure, and effectively coupling high-power to generate a high-density plasma, the disclosure is capable of generating a high-power and high-density plasma under high gas pressure and high gas flow rate (for example, greater than 1 Torr and 10 slm).

Figure 4:
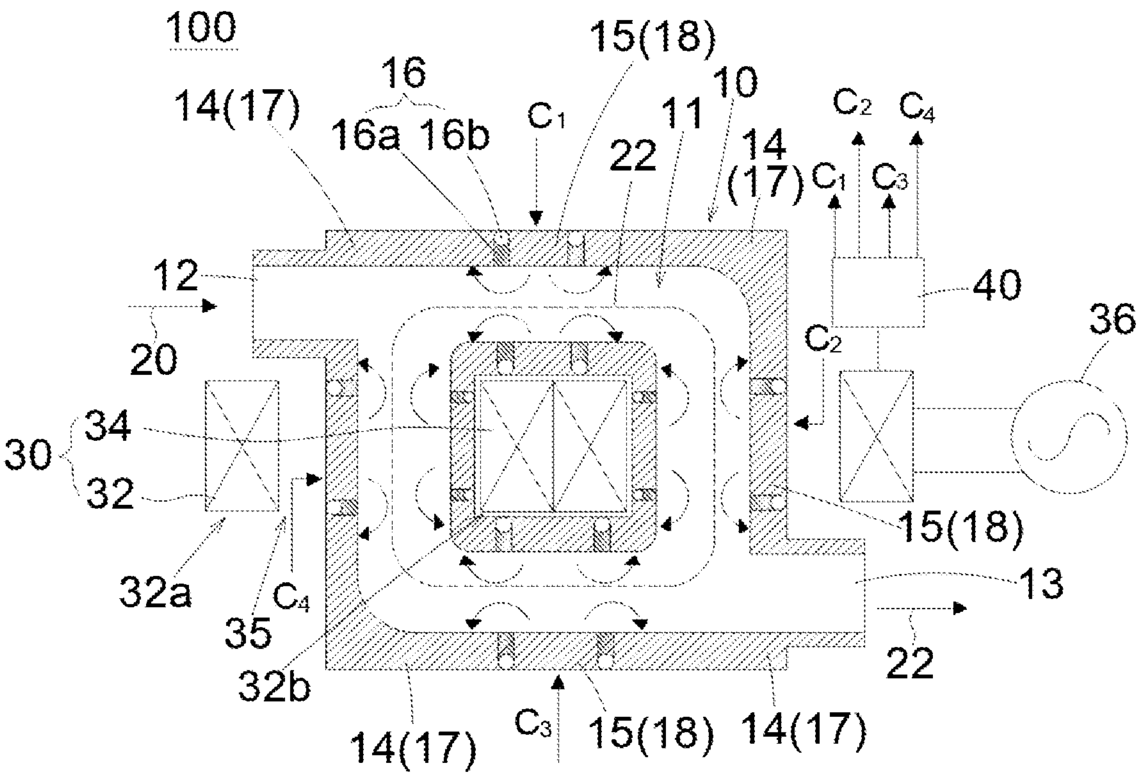
FIG. 4 is a cross-sectional view of a first implementation example of the hollow cathode discharge assistant transformer coupled plasma source of the disclosure.
Figure 5:
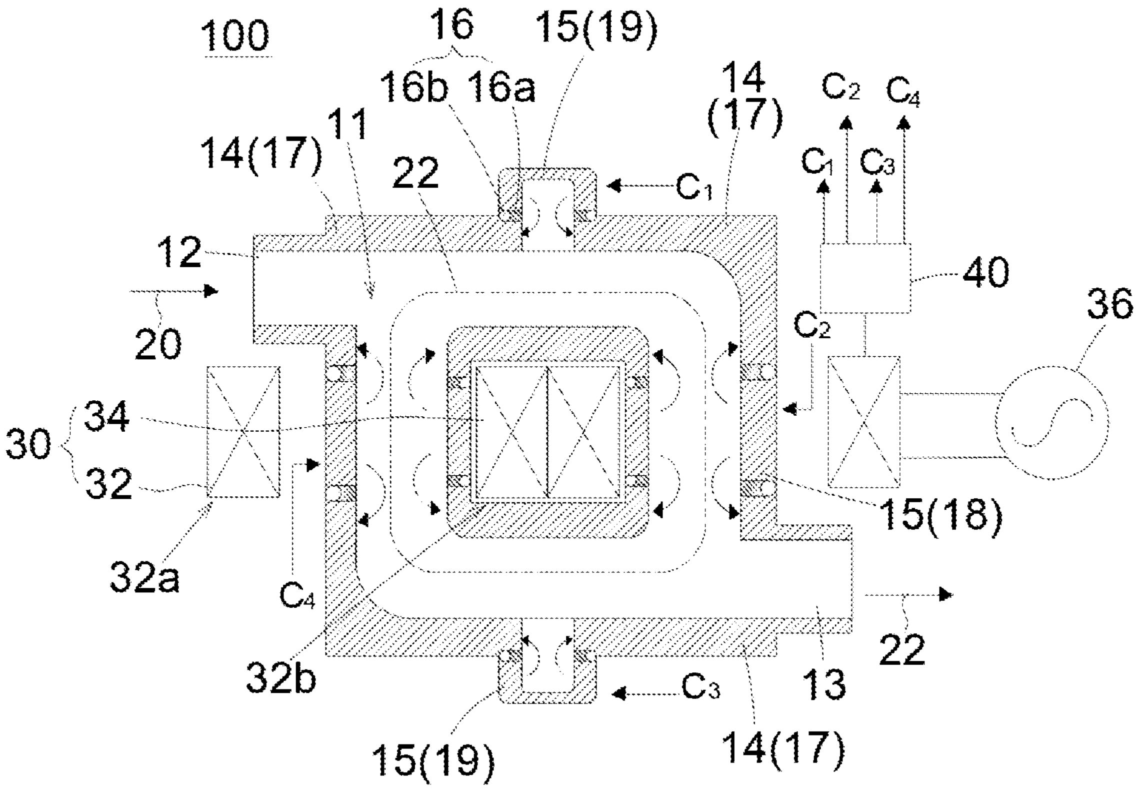
FIG. 5 is a cross-sectional view of a second implementation example of the hollow cathode discharge assistant transformer coupled plasma source of the disclosure.
Figure 6:
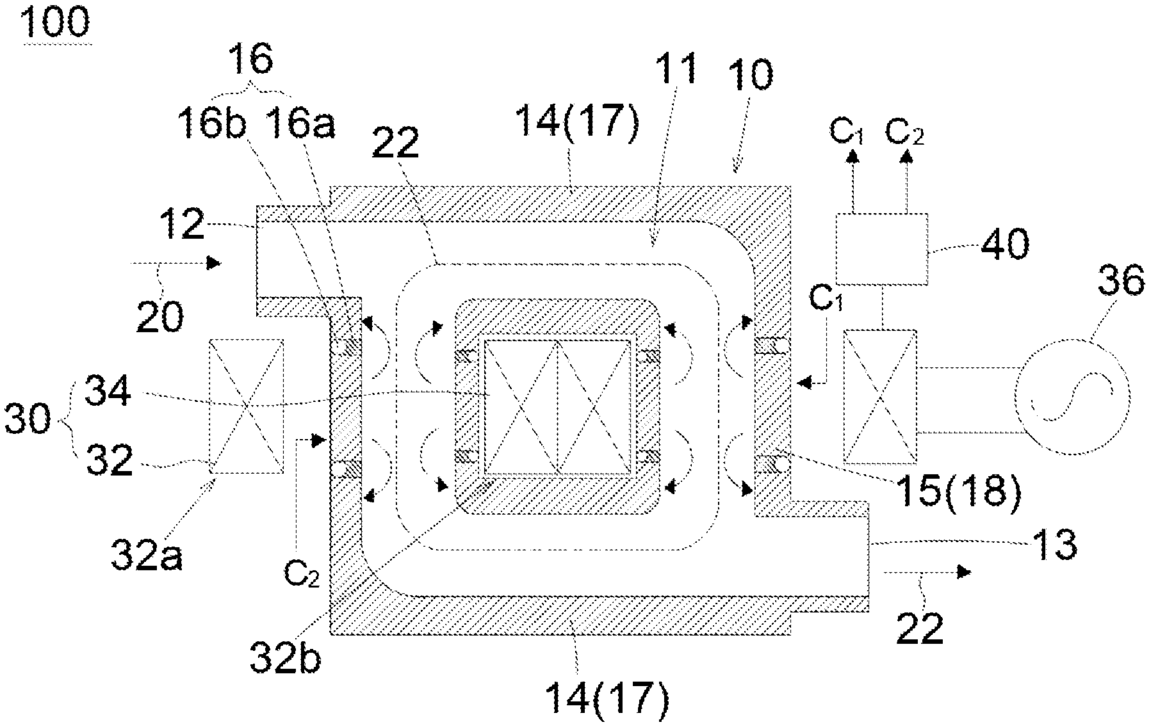
FIG. 6 is a cross-sectional view of a third implementation example of the hollow cathode discharge assistant transformer coupled plasma source of the disclosure.
Figure 7:
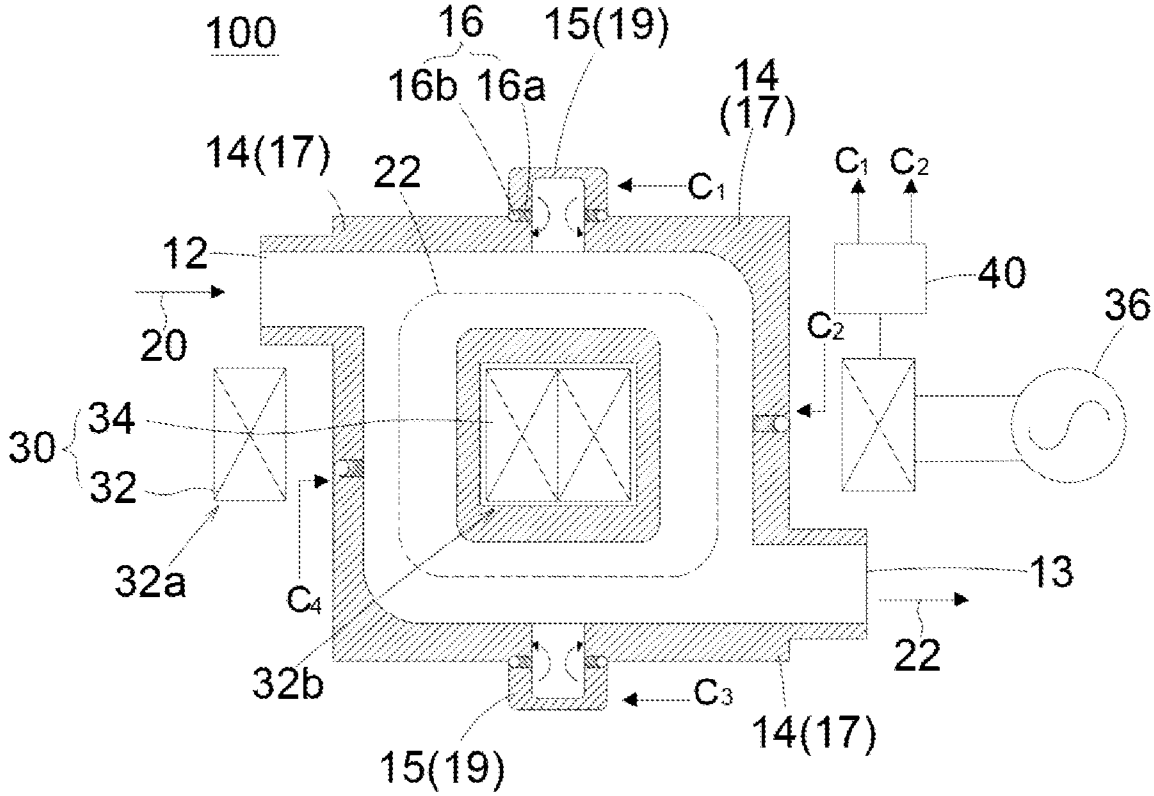
FIG. 7 is a cross-sectional view of a fourth implementation example of the hollow cathode discharge assistant transformer coupled plasma source of the disclosure.
Figure 8:
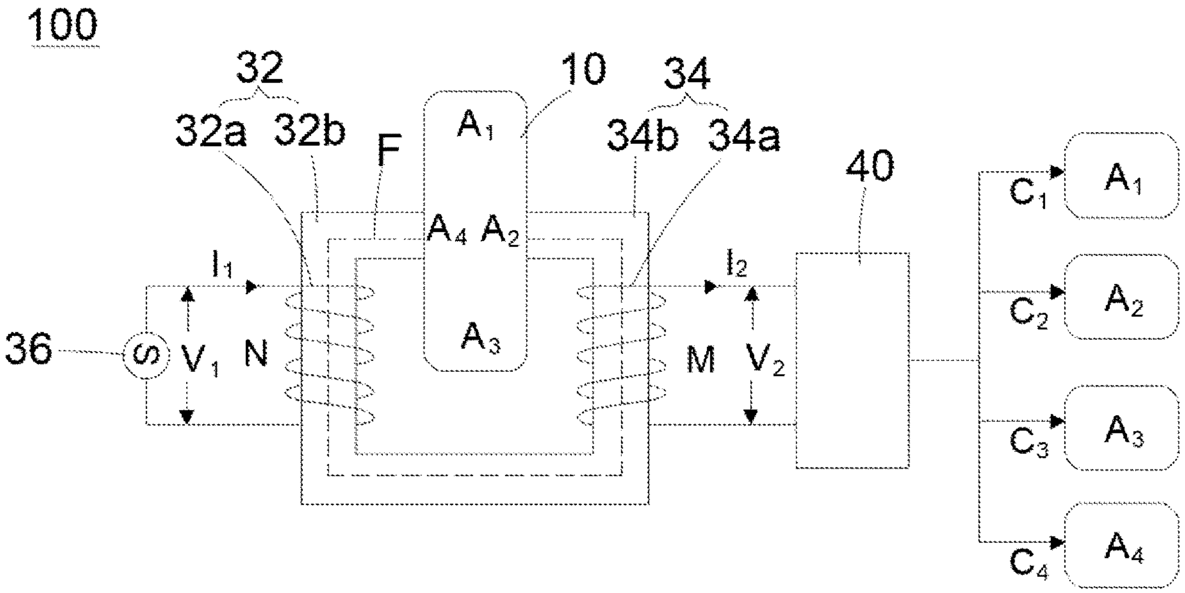
FIG. 8 is a schematic diagram of system operation of the hollow cathode discharge assistant transformer coupled plasma source of the disclosure.

Please refer to FIG. 4 to FIG. 8. FIG. 4 is a cross-sectional view of a first implementation example of the hollow cathode discharge assistant transformer coupled plasma source of the disclosure. FIG. 5 is a cross-sectional view of a second implementation example of the hollow cathode discharge assistant transformer coupled plasma source of the disclosure. FIG. 6 is a cross-sectional view of a third implementation example of the hollow cathode discharge assistant transformer coupled plasma source of the disclosure. FIG. 7 is a cross-sectional view of a fourth implementation example of the hollow cathode discharge assistant transformer coupled plasma source of the disclosure. FIG. 8 is a schematic diagram of system operation of the hollow cathode discharge assistant transformer coupled plasma source of the disclosure. A hollow cathode discharge assistant transformer coupled plasma source, e.g., a transformer coupled plasma source 100 assisted by hollow cathode discharge disclosed in the disclosure comprises a reaction chamber 10 and at least one ferrite transformer 30. The reaction chamber 10 is an annular chamber with an annular channel 11, and comprises a hollow chamber 14, a hollow cylindrical tube 15 and a barrier structure 16. The reaction chamber 10 has a gas inlet 12 and an outlet 13 respectively located at two ends of the annular channel 11 of the reaction chamber 10. A working gas 20 is introduced into the annular channel 11 of the reaction chamber 10 through the gas inlet 12, and the dissociated working gas 20 (i.e., a plasma 22) is exported to an outer side of the reaction chamber 10 through the outlet 13. A shape of the annular channel 11 and the annular chamber is not limited to a circle shape, and could also be any surrounding shape with a central hollow area (hollow area for short) such as a square shape or a rectangular shape. In addition, the reaction chamber 10 of the transformer coupled plasma source 100 assisted by hollow cathode discharge of the disclosure is, for example, connected to or integrated to a process chamber (not shown in the figures), so that the plasma 22 could be supplied to the process chamber through the outlet 13.

A type of the working gas 20 used in the disclosure is not limited, it could be determined according to actual manufacturing process requirements. For example, the working gas 20 could, for example, comprise an inert gas, a reactive gas, or a combination thereof. Characteristics of the transformer coupled plasma source 100 assisted by hollow cathode discharge disclosed in the disclosure lie in by combining the hollow-cathode discharge mechanism and the transformer coupled plasma mechanism, it is not required to install high-voltage electrodes or introduce high AC voltage to generate local radio-frequency glow discharge to be capable of solving a problem that a strength of an induced electromagnetic field of the TCP mechanism is not sufficient to ignite a plasma discharge under the conventional high gas pressure and high flow operating conditions. Since the disclosure does not need to use an external high-voltage discharge device to generate local radio-frequency glow discharge, it does not cause the problem that an availability of the conventional TCP operation is limited by a service life of the high-voltage discharge device and a vacuum window (such as quartz or ceramics). A gas pressure range of the working gas 20 used in the disclosure is from about $10^{-3}$ Torr to about $10^{3}$ Torr, and could be any numerical value and range in the above-mentioned gas pressure range, such as from about 0.5 Torr to about 10 Torr, such as from about 0.5 Torr to about 4 Torr, a numerical value of gas pressure could be adjusted according to different working gases or gas flow rates. A gas flow range of the working gas 20 is from about $10^{-2}$ slm to about $10^{2}$ slm, and could be any numerical value and numerical value range in the above-mentioned gas flow range, for example, from about 5 slm to about 20 slm, a numerical value of gas flow rate could be adjusted according to different working gases or gas pressures. According to a structural design of the disclosure, a gas pressure of the working gas 20 could be higher than 1 Torr, and a gas flow rate could be higher than 10 slm, so it could be applied to electronegative plasma discharge gases (such as $O_2$, $NF_3$, $SF_6$) involving high flow rates (greater than 1 slm) and relatively high gas pressures (greater than 1 Torr) to achieve requirements of high dissociation and activation of the working gas 20.

The ferrite transformer 30 of the transformer coupled plasma source 100 assisted by hollow cathode discharge of the disclosure comprises a pair of ferrite transformer magnetic cores 32, 34 and a drive power source 36. A first ferrite magnetic core 32*b* is connected to a second ferrite magnetic core 34*b* and jointly form an annular ferrite magnetic core, wherein the ferrite transformer magnetic core 32 comprises the first ferrite magnetic core 32*b* wound with a first coil 32*a*, the ferrite transformer magnetic core 34 comprises the second ferrite magnetic core 34*b* wound with a second coil 34*a*. The annular channel 11 of the reaction chamber 10 passes through a hollow area 35 between the first ferrite magnetic core 32*b* and the second ferrite magnetic core 34*b*. For example, in implementation modes shown in FIGS. 4 to 7, the annular channel 11 of the reaction chamber 10 passes through (i.e., passes through and surrounds) the hollow area 35 of the annular ferrite magnetic core. The drive power source 36 of the ferrite transformer 30 is electrically connected to the first coil 32*a* of the ferrite transformer magnetic core 32, and an alternating magnetic field is generated on the first ferrite magnetic core 32*b* by directly applying an AC power supply with a first voltage ($V_1$) to the first coil 32*a*.

As shown in implementation modes in FIGS. 4 to 7, the reaction chamber 10 of the disclosure is an annular chamber with the annular channel 11 formed by connecting and combining the at least one hollow chamber 14, the at least one hollow cylindrical tube 15, and the at least one barrier structure 16. The barrier structure 16 is located between the hollow chamber 14 and the hollow cylindrical tube 15, and is used to form at least one gap between the hollow chamber 14 and the hollow cylindrical tube 15, thereby providing at least one broken circuit on a circuit (or called circuit break). In order to facilitate the description of an operation mode of the disclosure, the disclosure uses the reaction chamber 10 comprising the hollow chambers 14, the hollow cylindrical tubes 15 and the barrier structures 16 as an illustrative example, wherein the barrier structures 16 are located between the hollow chambers 14 and the hollow cylindrical tubes 15 to form a plurality of gaps to provide a plurality of circuit breaks. The reaction chamber 10 is, for example, an anodized aluminum reaction chamber, which is applicable to corrosive activated particles (e.g., $NF_3$, $SF_6$ plasma) of high flow rates. The barrier structure 16 comprises, for example, a combined structure of a ceramic ring 16*a* and a sealing ring 16*b*, but is not limited thereto, as long as a circuit break could be formed on the hollow chamber 14 and the reaction chamber 10 is kept vacuum-seal, it belongs to a scope of protection claimed by the disclosure. For example, the sealing ring 16*b* could be an elastomer, such as an O-ring, to provide a removable vacuum seal, or to provide a permanent vacuum seal, such as by fixed connection. However, as long as the reaction chamber 10 could be kept vacuum-seal, the disclosure could optionally omit the sealing ring 16*b*.

In the disclosure, the reaction chamber 10 is, for example, formed by connecting a plurality of sections of the reaction chamber 10 (that is, the hollow chamber 14 and hollow cylindrical tube 15), materials of the hollow chamber 14 and the hollow cylindrical tube 15 could be the same or different, but for the convenience of description, the disclosure uses the hollow chamber 14 and the hollow cylindrical tube 15 of a same material as an example for illustration. In the disclosure, for example, the aluminum reaction chamber is anodized to form a protective film in order to obtain the anodized aluminum reaction chamber. However, a material of the reaction chamber 10 of the disclosure is not limited to the above examples, any material suitable for generating the plasma 22 belongs to a scope of protection claimed by the disclosure. For example, the reaction chamber 10 could be composed of, for example, a conductive material, or both conductive and dielectric materials. Suitable conductive materials include metals such as aluminum, copper, nickel, and steel, or a material of the reaction chamber 10 could also be a coated metal, such as anodized aluminum or nickel-plated aluminum. In addition, if the reaction chamber 10 is formed by connecting a conductive chamber with a dielectric material chamber, the disclosure could also replace the barrier structure 16 with the dielectric material chamber.

The annular channel 11 of the reaction chamber 10 passes through the hollow area 35 between the first ferrite magnetic core 32*b* and the second ferrite magnetic core 34*b*. The drive power source 36 directly applies an AC power supply with the first voltage ($V_1$) to the first coil 32*a* of the ferrite transformer 30 (that is, the ferrite transformer magnetic core 32 is used as a primary side circuit, or called a main circuit). Therefore, according to the transformer coupled plasma mechanism, the reaction chamber 10 could be used as a secondary side of the ferrite transformer 30, which means that once the working gas 20 is ionized, the plasma 22 generated in the annular channel 11 acts as a secondary side of the ferrite transformer 30. Therefore, the alternating magnetic field generated on the first ferrite magnetic core 32*b* could be used to induce an annular electric field in the annular channel 11 of the reaction chamber 10. Wherein, if a number of turns of the first coil 32*a* is N, wherein N is, for example, any numerical value, an induced voltage on the reaction chamber 10 is 1/N of the drive power source 36, and this voltage will be evenly distributed in gaps where sections of the reaction chamber 10 are connected (that is, positions of circuit breaks provided by the barrier structures 16). Taking eight gaps as an example, this voltage is ⅛N of a voltage of the drive power source 36. Since it is difficult for this gap voltage to directly excite the working gas 20 into the plasma 22, the disclosure uses the hollow cathode discharge mechanism to assist in exciting the plasma 22.

Please refer to FIG. 8, and FIG. 3 to FIG. 7 as well, since the drive power source 36 inputs a first current $I_1$ to directly apply an AC power supply with the first voltage ($V_1$) to a primary-side coil (that is, the first coil 32*a*) of the ferrite transformer 30, so a secondary-side coil (that is, the second coil 34*a*) of the ferrite transformer 30 is capable of generating a second current $I_2$ and a second voltage ($V_2$) by inducing a magnetic flux F of the alternating magnetic field. Characteristics of the disclosure lie in applying the second voltage ($V_2$) to the reaction chamber 10, for example, the same second voltage ($V_2$) is applied to each section of the reaction chamber 10 in order to excite the working gas 20 in the annular channel 11 into the plasma 22 through the hollow cathode discharge mechanism. For example, the second voltage ($V_2$) is, for example, connected in parallel with the hollow cylindrical tubes 15, so that, for example, the hollow cylindrical tubes 15 have a same voltage, wherein a numerical value of the second voltage ($V_2$) is a numerical value of the first voltage ($V_1$) multiplied by (M/N), where M is a number of turns of the second coil 34*a*, N is a number of turns of the first coil 32*a*, M and N are, for example, any real numbers, wherein $V_2$=M/N$V_1$. With an appropriate turn ratio, the second voltage $V_2$ could, for example, exceed about 500 volts, thereby exciting a stable plasma in the hollow cylindrical tube 15 through a physical mechanism of hollow cathode discharge. The transformer coupled plasma source 100 assisted by hollow cathode discharge of the disclosure could optionally comprise at least one controller 40, which is, for example, electrically connected between the second coil 34*a* and the hollow cylindrical tube 15. The controller 40 is capable of optionally generating corresponding control signals (for example, control signals $C_1$~$C_4$ shown in FIG. 4 to FIG. 5 or control signals $C_1$~$C_2$ shown in FIG. 6 to FIG. 7) according to actual requirements to control the induced second voltage ($V_2$) to be supplied to a plurality of regions (for example, regions $A_1$~$A_4$) of the reaction chamber 10 corresponding to the hollow cylindrical tubes 15 in order to excite the working gas 20 in the annular channel 11 into the plasma 22 through the hollow cathode discharge mechanism. Wherein, since a person having ordinary skill in the art to which the disclosure pertains could understand how to supply the second voltage ($V_2$) to the reaction chamber 10 and how to use the controller 40 to control the second voltage ($V_2$) to be supplied to the reaction chamber 10 to perform the hollow cathode discharge mechanism according to the foregoing content of the disclosure, so it will not be further described herein.

Characteristics of the disclosure lie in the alternating magnetic field could be induced through the transformer coupled plasma mechanism to generate an induced electric field in the annular channel 11 of the reaction chamber 10, which is used to excite the plasma 22 generated through the hollow cathode discharge mechanism to form an electric current (electron drift current) with a closed path in the annular channel 11 of the reaction chamber 10, and further dissociate the working gas 20 to increase a density of the plasma 22. In short, the disclosure uses the hollow cathode discharge mechanism to effectively generate the plasma 22 in different regions in the reaction chamber 10, so that the transformer coupled plasma mechanism is capable of easily forming an annular plasma structure, and effectively coupling high-power to generate a high-density plasma.

In FIG. 4 to FIG. 7 illustrated in the disclosure, the hollow cylindrical tubes 15 of the reaction chamber 10 are, for example, selected from a group consisting of double-opening metal tubes 18 and single-opening metal tubes 19, that is, the hollow cylindrical tube 15 could optionally be the double-opening metal tube 18, the single-opening metal tube 19 or the double-opening metal tube 18 and the single-opening metal tube 19. However, as long as the hollow cylindrical tube 15 could be provided for performing the transformer coupled plasma mechanism, any shape, material or size of the hollow cylindrical tube 15 belongs to a scope of protection claimed by the disclosure. The double-opening metal tube 18 refers to that the metal tube is a hollow tube and two opposite sides thereof are open ends with openings. The single-opening metal tube 19 refers to that the metal tube is a hollow tube and one of two opposite sides thereof is an open end with an opening, and the other of the two opposite sides thereof is a closed end.

Taking a first implementation mode shown in FIG. 4 as an example, the hollow chambers 14 are four metal chambers 17, the hollow cylindrical tubes 15 are the four double-opening metal tubes 18, and a number of the barrier structures 16 is eight, which could form eight gaps. Wherein, the four metal chambers 17 form four corners of the annular chamber respectively, and shapes thereof are as shown in FIG. 4, for example. The four double-opening metal tubes 18 respectively form four sides of the annular chamber, and the eight barrier structures 16 are respectively located between the adjacent metal chambers 17 and the double-opening metal tubes 18 to jointly form the annular chamber with the annular channel 11.

In a second implementation example shown in FIG. 5, the hollow chambers 14 are the two metal chambers 17, the hollow cylindrical tubes 15 are the two double-opening metal tubes 18 and the two single-opening metal tubes 19, a number of the barrier structures 16 is six, which could form four gaps on a complete circuit. Wherein, the two metal chambers 17 form a top side and a bottom side of the annular chamber respectively, and shapes thereof are as shown in FIG. 5, for example, the two double-opening metal tubes 18 form two sides of the annular chamber, the two single-opening metal tubes 19 are respectively located on sides of the two metal chambers 17, and the six barrier structures 16 are respectively located between the adjacent metal chambers 17 and the double-opening metal tubes 18 and between the metal chambers 17 and the single-opening metal tubes 19 to jointly form the annular chamber with the annular channel 11. If a number of turns of the first coil 32*a* is N, an induced voltage on the reaction chamber 10 is 1/N of the drive power source 36, and this voltage is evenly distributed in gaps where sections of the reaction chamber 10 are connected (that is, positions of the barrier structures 16), taking four gaps as an example, this voltage is ¼N of a voltage of the drive power source 36.

Taking a third implementation mode shown in FIG. 6 as an example, the hollow chambers 14 are the two metal chambers 17, the hollow cylindrical tubes 15 are the two double-opening metal tubes 18, and a number of the barrier structures 16 is four, which means comprising a combined structure of four sets of the ceramic rings 16*a* and the sealing rings 16*b*, which could form four gaps. Wherein, the two metal chambers 17 form a top side and a bottom side of the annular chamber respectively, and shapes thereof are, for example, as shown in FIG. 6, the two double-opening metal tubes 18 form two sides of the annular chamber respectively, and the four barrier structures 16 are respectively located between the adjacent metal chambers 17 and the double-opening metal tubes 18 to jointly form the annular chamber with the annular channel 11.

In a fourth implementation example shown in FIG. 7, the hollow chambers 14 are the two metal chambers 17, the hollow cylindrical tubes 15 are the single-opening metal tubes 19, such as the two single-opening metal tubes 19, a number of the barrier structures 16 is four, which could form two gaps on a complete circuit. The two metal chambers 17 respectively form peripheries of the annular chamber, and shapes thereof are, for example, as shown in FIG. 7, the two single-opening metal tubes 19 are respectively located on sides of the two metal chambers 17, wherein two of the barrier structures 16 are respectively located between the metal chambers 17 and the single-opening metal tubes 19, and the other two barrier structures 16 are respectively located on the metal chambers 17 to jointly form the annular chamber with the annular channel 11. Wherein, although the single-opening metal tubes 19 are two metal tubes as an example, a number of the single-opening metal tubes 19 could also be optionally greater than two, such as four or more, according to actual requirements.

In short, the transformer coupled plasma technology of the disclosure could cause the plasma 22 form an annular structure, so energy could be transferred to the plasma 22 very effectively, so that an annular structured plasma in the reaction chamber 10 is capable of forming a transformer coupled secondary side to perform an inductive energy reaction. The transformer coupled plasma source 100 assisted by hollow cathode discharge of the disclosure utilizes an electric field generated in the reaction chamber 10 by the hollow cathode discharge mechanism to excite the stable plasma 22 under high gas pressure and high gas flow rate (gas pressure >1 Torr, gas flow rate >1 slm) to provide sufficient free electrons to be driven and accelerated by an electric field induced and generated by the ferrite transformer 30 to form a closed-path electron drift current in the reaction chamber 10 to further effectively dissociate a gas and generate a high-density plasma. Although the transformer coupled plasma technology is capable of transferring energy into the plasma 22 very effectively, like many inductively coupled plasma devices, an intensity (10 V/cm) of an induced electric field is not sufficient to break down the working gas 20 and form an annular plasma structure. Especially under high gas pressure and high gas flow rate, although high-voltage devices (greater than 1 kV) could be used to generate an initial discharge in the reaction chamber 10 (i.e., a vacuum chamber) to achieve an object of igniting the plasma 22, the service life and availability of high-voltage discharge devices are limited, and could easily cause damage to a chamber body of the reaction chamber 10. In particular, transformer coupled plasma is a mechanism with low electric field strength, when gas pressure or gas flow is disturbed, it is extremely easy to form plasma instability and destroy the annular plasma structure, resulting in a situation where the plasma is extinguished, such as when converting a flow rate of the working gas 20 in a manufacturing process. Therefore, the disclosure combines structural sections of the reaction chamber 10 with the hollow cathode plasma mechanism to facilitate formation of the annular plasma structure easily, and also improve a stability of the annular plasma structure when a gas pressure or a gas flow is disturbed. Compared with the conventional technology, an operating voltage required by the disclosure is small, which could greatly reduce damage of the vacuum reaction chamber and increase a service life of the reaction chamber 10.

In addition, a power supply (that is, the drive power source 36) for driving the TCP plasma of the disclosure is composed of an AC power supply and a transformer, for example. Taking the drive power source 36 as the AC power supply as an example, a frequency of the AC power supply used is properly selected to be suitable for driving a plasma, and to suit withstand voltage and withstand current of power components, and losses of the ferrite transformer magnetic cores 32, 34, a range thereof is, for example, from about 100 kHz to about 500 kHz. The AC power supply could be operated at constant power or constant current. An output voltage ranges, for example, from about 300 volts to about 500 volts, or could be, for example, any numerical value or range of several hundred volts (e.g., from about 300 volts to about 350 volts). In the conventional technology, a load impedance of the AC power supply changes greatly from low-density plasma to stable high-density plasma during a process of plasma excitation, which poses great challenges to power components. In the disclosure, because strong electric field and high efficiency of an initial hollow cathode discharge could excite a certain density of plasma, it could greatly reduce dynamic changes of the load impedance and reduce a probability of problems occurring in the power components. At the same time, it is not necessary to use a resonant circuit and a non-resonant circuit to operate in an interactive manner as in the conventional technology, so the disclosure is capable of reducing a circuit complexity in order to improve stability and availability.

Based on the above, the hollow cathode discharge assistant transformer coupled plasma source and an operation method of the same of the disclosure have one or more of the following advantages:

(1) The disclosure is capable of generating a high-power and high-density plasma under high gas pressure and high gas flow rate by combining a hollow cathode discharge structure with a transformer coupled plasma structure.

(2) By combining the hollow cathode discharge structure with the transformer coupled plasma structure, the disclosure is capable of eliminating the drawbacks of having to use a high-voltage ignition device and resonant operation.

(3) By combining the hollow cathode discharge structure and the transformer coupled plasma structure, the disclosure is capable of solving the drawbacks of TCP's weak electric field and improving plasma stability.

(4) By combining the hollow cathode discharge structure and the transformer coupled plasma structure, the disclosure only requires a small operating voltage to be capable of greatly reducing damage to the vacuum reaction chamber and prolonging a service life thereof.

Note that the specification relating to the above embodiments should be construed as exemplary rather than as limitative of the present disclosure, with many variations and modifications being readily attainable by a person of average skill in the art without departing from the spirit or scope thereof as defined by the appended claims and their legal equivalents.

What is claimed is:

1. A hollow cathode discharge assistant transformer coupled plasma source at least comprising:

a reaction chamber having an annular channel, wherein the reaction chamber further has a gas inlet and an outlet located at the annular channel of the reaction chamber; and at least one ferrite transformer comprising a first ferrite magnetic core wound with a first coil, a second ferrite magnetic core wound with a second coil and a drive power source, wherein the annular channel of the reaction chamber passes through a hollow area between the first ferrite magnetic core and the second ferrite magnetic core, wherein the drive power source applies an AC power supply with a first voltage to the first coil to generate an alternating magnetic field on the first ferrite magnetic core, wherein the second coil generates a second voltage by inducing the alternating magnetic field, and the second voltage is applied to at least one hollow cylindrical tube of the reaction chamber to excite a working gas in the annular channel into a plasma through a hollow cathode discharge mechanism, wherein the annular channel of the reaction chamber induces the alternating magnetic field through a transformer coupled plasma mechanism to generate an induced electric field to excite the plasma to form an electric current with a closed path in the annular channel of the reaction chamber to further dissociate the working gas in order to increase a density of the plasma.

2. The hollow cathode discharge assistant transformer coupled plasma source as claimed in claim 1, wherein the reaction chamber is an annular chamber comprising at least one hollow chamber, the at least one hollow cylindrical tube and at least one barrier structure, the barrier structure forms at least one gap between the hollow chamber and the at least one hollow cylindrical tube to provide at least one circuit break, and the at least one hollow cylindrical tube is selected from a group consisting of a double-opening metal tube and a single-opening metal tube.

3. The hollow cathode discharge assistant transformer coupled plasma source as claimed in claim 1, wherein the reaction chamber is an annular chamber comprising a plurality of hollow chambers, a plurality of hollow cylindrical tubes and a plurality of barrier structures, and the barrier structures form a plurality of gaps between the hollow chambers and the hollow cylindrical tubes to provide a plurality of circuit breaks.

4. The hollow cathode discharge assistant transformer coupled plasma source as claimed in claim 3, wherein the hollow chambers are a plurality of metal chambers, the hollow cylindrical tubes are a plurality of double-opening metal tubes, and the double-opening metal tubes are connected to the metal chambers via the barrier structures to form the annular chamber.

5. The hollow cathode discharge assistant transformer coupled plasma source as claimed in claim 4, wherein a number of the metal chambers is two, the metal chambers respectively form a top side and a bottom side of the annular chamber, a number of the double-opening metal tubes is two, the double-opening metal tubes form two sides of the annular chamber, and two ends of the double-opening metal tubes are connected to the metal chambers via the barrier structures.

6. The hollow cathode discharge assistant transformer coupled plasma source as claimed in claim 4, wherein a number of the metal chambers is four, the metal chambers respectively form four corners of the annular chamber, a number of the double-opening metal tubes is four, the double-opening metal tubes respectively form four sides of the annular chamber, and two ends of the double-opening metal tubes are connected to the two adjacent metal chambers via the barrier structures.

7. The hollow cathode discharge assistant transformer coupled plasma source as claimed in claim 3, wherein the hollow chambers are a plurality of metal chambers, the hollow cylindrical tubes are a plurality of double-opening metal tubes and a plurality of single-opening metal tubes, and the double-opening metal tubes and the single-opening metal tubes are connected to the metal chambers via the barrier structures.

8. The hollow cathode discharge assistant transformer coupled plasma source as claimed in claim 7, wherein a number of the metal chambers is two, the metal chambers respectively form a top side and a bottom side of the annular chamber, a number of the double-opening metal tubes is two, the double-opening metal tubes form two sides of the annular chamber, a number of the single-opening metal tubes is two, and the single-opening metal tubes are respectively connected to the metal chambers.

9. The hollow cathode discharge assistant transformer coupled plasma source as claimed in claim 3, wherein the hollow chambers are a plurality of metal chambers, the hollow cylindrical tubes are a plurality of single-opening metal tubes, and the single-opening metal tubes are connected to the metal chambers via the barrier structures.

10. The hollow cathode discharge assistant transformer coupled plasma source as claimed in claim 9, wherein a number of the metal chambers is two, the metal chambers respectively form a top side and a bottom side of the annular chamber, a number of the single-opening metal tubes is two, and the single-opening metal tubes are respectively connected to the metal chambers.

11. The hollow cathode discharge assistant transformer coupled plasma source as claimed in claim 3, wherein the second coil generates the second voltage by inducing the alternating magnetic field, the second voltage is applied in parallel to the hollow cylindrical tubes, and a numerical value of the second voltage is a numerical value of the first voltage multiplied by M/N, wherein M is a number of turns of the second coil, and N is a number of turns of the first coil.

12. The hollow cathode discharge assistant transformer coupled plasma source as claimed in claim 3, wherein each of the barrier structures comprises a ceramic ring.

13. The hollow cathode discharge assistant transformer coupled plasma source as claimed in claim 12, wherein each of the barrier structures further comprises a sealing ring.

14. The hollow cathode discharge assistant transformer coupled plasma source as claimed in claim 1, wherein the first ferrite magnetic core wound with the first coil serves as a primary side of a transformer structure, and the annular channel of the reaction chamber serves as a secondary side of the transformer structure to generate the induced electric field in the annular channel by utilizing the transformer coupled plasma mechanism.

15. The hollow cathode discharge assistant transformer coupled plasma source as claimed in claim 1, further comprising at least one controller electrically connected between the second coil and the hollow cylindrical tube for controlling the second voltage to be supplied to the hollow cylindrical tube of the reaction chamber.

16. The hollow cathode discharge assistant transformer coupled plasma source as claimed in claim 1, wherein the gas inlet and the outlet are respectively located at two ends of the annular channel of the reaction chamber.

17. The hollow cathode discharge assistant transformer coupled plasma source as claimed in claim 1, wherein the reaction chamber is an anodized aluminum reaction chamber.

18. The hollow cathode discharge assistant transformer coupled plasma source as claimed in claim 1, wherein an output frequency of the AC power supply ranges from 100 kHz to 500 KHz.

19. The hollow cathode discharge assistant transformer coupled plasma source as claimed in claim 1, wherein the AC power supply is constant power or constant current, and an output voltage of the AC power supply ranges from 300 volts to 500 volts.

20. The hollow cathode discharge assistant transformer coupled plasma source as claimed in claim 1, wherein a gas pressure of the working gas is between 0.5 Torr and 10 Torr.

21. The hollow cathode discharge assistant transformer coupled plasma source as claimed in claim 1, wherein a gas flow rate of the working gas is from $10^{-2}$ slm to $10^{2}$ slm.

22. An operation method of a hollow cathode discharge assistant transformer coupled plasma source, characterized in that utilizing a hollow cathode discharge mechanism to cause a working gas forming a plasma in the hollow cathode discharge assistant transformer coupled plasma source as claimed in claim 1, and utilizing a transformer coupled plasma mechanism for coupling energy to the plasma to cause the plasma discharging and generating an electron drift current, and further effectively dissociating the working gas to increase a density of the plasma.

* * * * *